H. P. RESTON.
GEARING.
APPLICATION FILED SEPT. 16, 1911.

1,018,081.

Patented Feb. 20, 1912.
2 SHEETS—SHEET 1.

Witnesses.
Chas. G. Johannesmeyer
Samuel S. Carr.

Henry P. Reston, Inventor.
By Robert S. Carr,
Attorney.

H. P. RESTON.
GEARING.
APPLICATION FILED SEPT. 16, 1911.
1,018,081.
Patented Feb. 20, 1912.
2 SHEETS—SHEET 2.
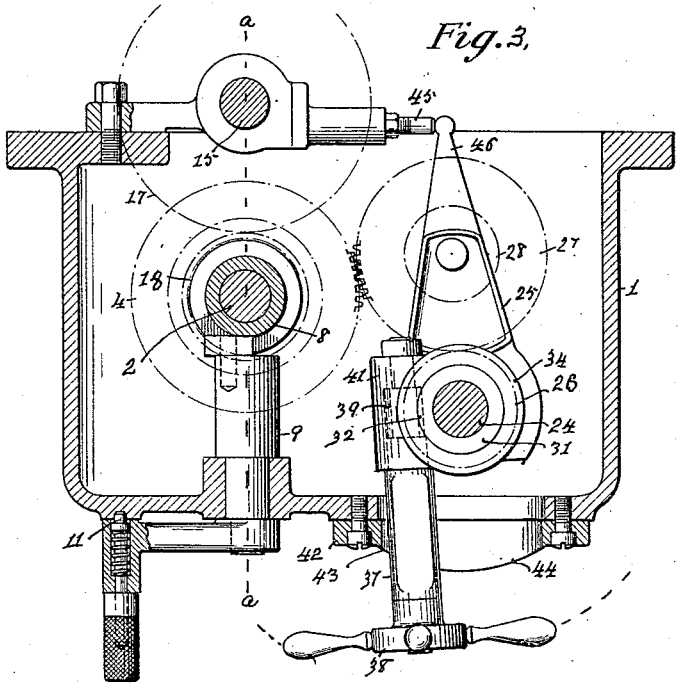
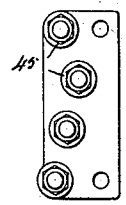
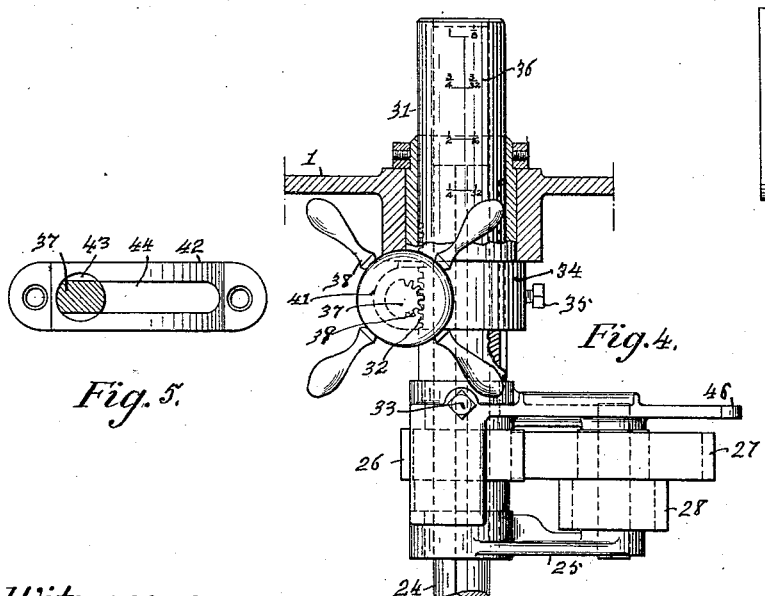
Witnesses.
Chas. G. Johannemeyer
Samuel S. Carr.
Inventor:
Henry P. Reston,
By Robert S. Carr,
Attorney.

UNITED STATES PATENT OFFICE.

HENRY P. RESTON, OF OAKLEY, OHIO, ASSIGNOR TO THE CINCINNATI PLANER COMPANY, OF OAKLEY, OHIO, A CORPORATION OF OHIO.

GEARING.

1,018,081.        Specification of Letters Patent.      Patented Feb. 20, 1912.

Application filed September 16, 1911. Serial No. 649,650.

*To all whom it may concern:*

Be it known that I, HENRY P. RESTON, a citizen of England, residing at Oakley, Ohio, have invented a new and useful Improvement in Gearing, of which the following is a specification.

Figure 1:
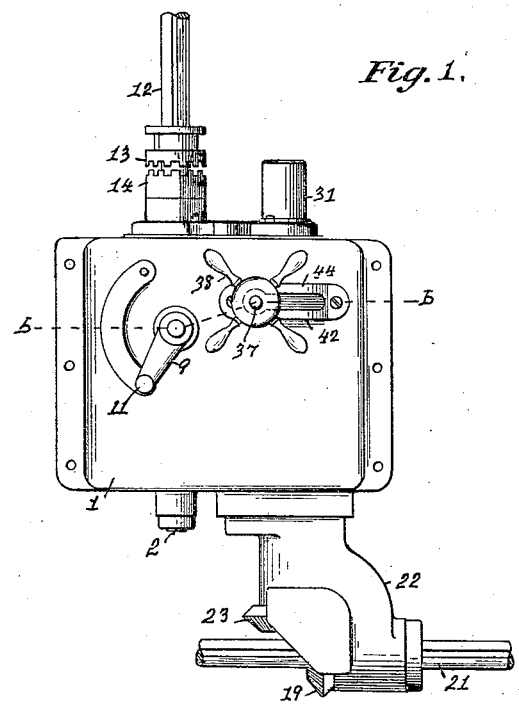
Figure 2:
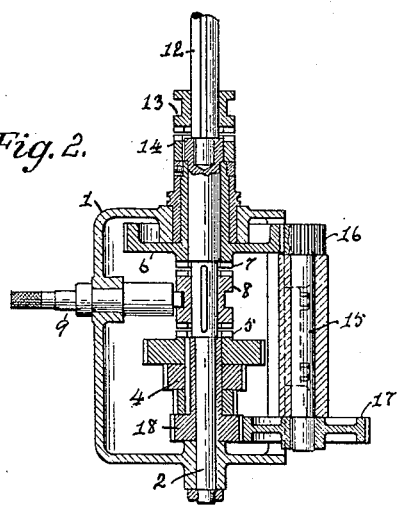

My invention relates to gearing of the class adapted to the use of machine tools or other suitable purposes, and the objects of my improvement are to provide means for moving and maintaining the tumbler gears in registration with corresponding cone gears; to provide means for preventing the engagement of the tumbler gears with any of the cone gears until they are in registration therewith; to provide means for indicating the different positions of movable concealed gears; to provide means for obtaining a large number of speed changes of a driven shaft with a compact arrangement of the gears, and to provide simple and durable construction and assemblage of the various parts for securing facility of operation and efficiency of action. These objects may be attained in the following described manner as illustrated in the accompanying drawings, in which:

Figure 1 is a front elevation of the casing inclosing the gearing embodying my improvement; Fig. 2 a section on the line $a$—$a$ of Fig. 3; Fig. 3 a section on the broken line $b$—$b$ of Fig. 1; Fig. 4 an elevation of the tumbler with parts in section; Fig. 5 a plan of the slotted plate for locking the tumbler in predetermined position of adjustment, and Figs. 6 and 7 front and side elevations respectively of the adjustable stops for the tumbler.

In the drawings, 1 represents the casing, 2 the driven shaft journaled therein, and provided with a loose cone of gears 4 formed with a clutch member 5 and with a loose back gear 6 formed with a clutch member 7. A double clutch member 8 splined on said shaft is movable alternately into engagement with the clutch members 5 and 7 by means of the eccentric crank shaft 9 which is provided with the usual locking pin 11. A shaft 12 may be journaled in alinement with shaft 2 and a clutch member 13 splined thereon is adapted to engage with the clutch member 14 secured on the end of shaft 2, as shown in Fig. 2. The back gear shaft 15 is provided with a pinion 16 and a gear 17 engaging respectively with the back gear 6 and gear 18 secured to the cone gears 4.

A bevel gear 19 splined on a driven shaft 21 journaled in the depending bracket 22 engages with a bevel gear 23 on the tumbler shaft 24. A yoked tumbler 25 is sleeved on the tumbler shaft and a gear 26 splined on said shaft is movable longitudinally thereon with the tumbler. The tumbler gear 27 secured to the smaller gear 28 engages with gear 26 on shaft 24. A sleeve 31 formed with a rack 32 and loosely mounted on the tumbler shaft is secured to the tumbler 25 by means of screw 33. Said sleeve is splined within the bearing collar 34 by means of a screw 35 and projects through the wall of the casing. Numbers 36 properly located on the projecting portion of said sleeve serve to indicate by its longitudinal position the different speeds of shaft 2.

A shaft 37 having its intermediate portion flattened on opposite sides and provided with a hand wheel 38 and a pinion 39 engaging with rack 32 is journaled in bearing 41 formed on one side of collar 34 as shown in Figs. 3 and 4. A locking plate 42 secured on the casing is formed with a circular opening 43 having a narrow slot 44 extending therefrom. Shaft 37 inserted through opening 43 may be rotatively adjusted therein for moving the sleeve 31 and the tumbler with the tumbler gears into registration with corresponding gears of the cone of gears 4. The parts are so arranged that when the tumbler gears register with the corresponding cone gears as indicated by the numbers 36 on sleeve 31 the flattened portion of shaft 37 may be moved edgewise within the narrow slot 44 for engaging said gears and for locking them in registered position. Adjustable stops 45 serve to intercept the leg 46 formed on the tumbler for properly limiting the mesh of the tumbler gears with the cone gears.

In operation, the tumbler gears driven at constant speed may be engaged separately with corresponding cone gears for driving the cone and also the back gear through its connections therewith at different speeds. The intervening clutch serves to connect the driven shaft with the cone gears or the back gear as desired. The flattened shaft serves to register the desired tumbler gear with the corresponding cone gear and also to engage it therewith and simultaneously lock it in proper registered position.

Having fully described my improvement what I claim as my invention and desire to secure by Letters Patent of the United States is:—

1. A gearing comprising a fixed plate formed with a slot terminating at one end in an enlarged opening, a flattened shaft rotatable within the opening and movable edgewise within the slot, and a tumbler movable longitudinally with the rotation of the shaft and rotatively with the edgewise movement thereof.

2. A gearing comprising a driving and a driven shaft, a cone of loose gears on the driving shaft, clutch connections of the said shaft therewith, a rack sleeve movable on the driven shaft and provided with a tumbler, a tumbler gear, a gear splined on the driven shaft engaging therewith, a collar splined on the sleeve and journaled in a fixed bearing, a flattened shaft journaled in the collar, a pinion thereon engaging with the rack sleeve, and a stationary slotted plate wherein the flattened shaft is movable edgewise for locking it in predetermined rotative adjustment.

3. A gearing comprising a shaft, a cone of gears mounted to turn thereon, clutch connections between said shaft and gears, a tumbler shaft, a rack sleeve movable thereon and provided with a tumbler, a tumbler gear, a gear splined on the tumbler shaft engaging therewith, a collar splined on the sleeve and journaled in a fixed bearing, a flattened shaft journaled in the collar, a pinion thereon engaging with the rack sleeve, and a stationary slotted plate wherein the flattened shaft is movable edgewise for locking it in a predetermined position of rotative adjustment.

4. The combination of a shaft, a gear splined thereon, a sleeve movable on the shaft and formed with a rack, a collar bearing splined on the sleeve and journaled in a fixed bearing, a shaft journaled in the collar bearing a hand wheel thereon and also a pinion on said shaft engaging with the rack, a tumbler secured to the sleeve, a tumbler gear thereon engaging with the shaft gear, and means for locking the latter shaft in predetermined position of rotative adjustment.

5. In a gearing the combination of a fixed plate formed with a circular opening and with a narrow slot extending therefrom, a flattened shaft rotatable within the opening and movable edgewise within the slot, a movable tumbler, and rack and pinion connections from the shaft therewith.

6. A gearing comprising a fixed plate formed with a slot, a rotatable collar mounted in fixed relation thereto, a flattened shaft journaled thereon and movable edgewise within the slot for rotatively adjusting the collar, and a tumbler splined in the collar.

7. A gearing comprising a stationary plate formed with a slot, a driven shaft, a tumbler sleeve movable thereon and formed with a rack, a collar journaled in a fixed bearing and splined on the sleeve, a flattened tangent shaft journaled on the collar and movable edgewise within the slot for rotatively adjusting the sleeve, and a pinion on the shaft engaging with the rack for adjusting the sleeve longitudinally when the tangent shaft is disengaged from the slot.

HENRY P. RESTON.

Witnesses:
CHAS. G. JOHANNESMEYER,
R. S. CARR.

---

Copies of this patent may be obtained for five cents each, by addressing the "Commissioner of Patents, Washington, D. C."